United States Patent [19]

Burns

[11] 4,445,780
[45] May 1, 1984

[54] FIBER OPTIC ROTATION-SENSING GYROSCOPE WITH (3×2) COUPLER

[75] Inventor: William K. Burns, Alexandria, Va.

[73] Assignee: The United States of America as represented by the Secretary of the Navy, Washington, D.C.

[21] Appl. No.: 353,677

[22] Filed: Mar. 1, 1982

[51] Int. Cl.³ .......................... G01C 19/64; G02B 5/14
[52] U.S. Cl. .................................. 356/350; 350/96.15
[58] Field of Search ...................... 356/350; 350/96.15, 350/96.16

[56] References Cited

U.S. PATENT DOCUMENTS 3,102,953 9/1963 Wallace ............................... 356/350
4,013,365 3/1977 Vali et al. ............................ 356/350

OTHER PUBLICATIONS

Rashleigh and Burns, Dual-Input Fiber-Optic Gyroscope, Optics Ltrs., vol. 5, No. 11, p. 482, Nov. 1980.
Patent Application No. 320,999.
"Dielectric Rectangular Waveguides and Directional Couplers for Integrated Optics" *Bell Syst. Tech. J.*, vol. 48, pp. 2071-2102, Sep. 1967.

*Primary Examiner*—Vincent P. McGraw
*Attorney, Agent, or Firm*—Robert F. Beers; William T. Ellis; Charles E. Krueger

[57] ABSTRACT

A Sagnac gyroscope, for measuring rotation rates, having an optical coupler, adapted for fabrication by integrated optical techniques, which is compact and provides for operation of the gyroscope at quadrature for small rotation rates. The optical coupler is a symmetrical, channel waveguide structure comprising a two-mode central waveguide branching into three one-mode input waveguides at one end and into two one-mode output waveguides at the other end. The output waveguides are optically coupled to the ends of a fiber-optic loop which provides a closed optical path in which the Sagnac phase shift is produced. The middle input waveguide is adapted to transmit an incident beam into the optical coupler while the outer input waveguides are adapted to transmit the output beams of the Sagnac gyroscope to a circuit for measuring and comparing the intensities of the beams in the outer waveguides so that the rotation rate may be determined.

23 Claims, 11 Drawing Figures

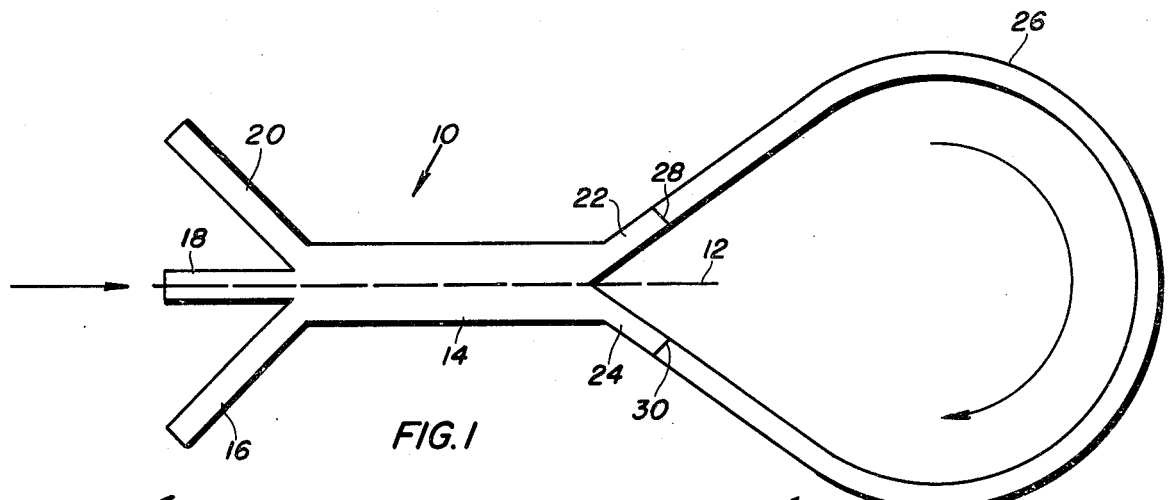
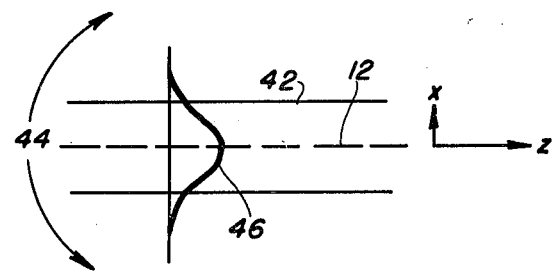
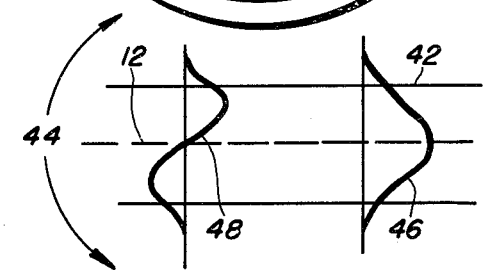
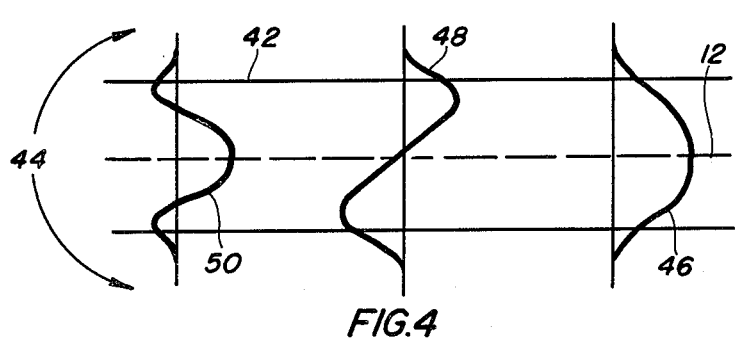
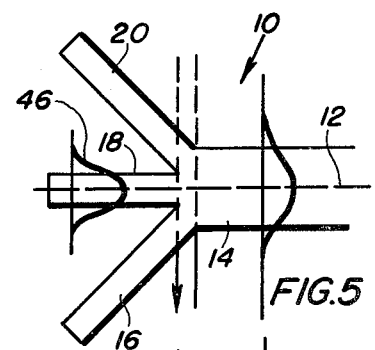
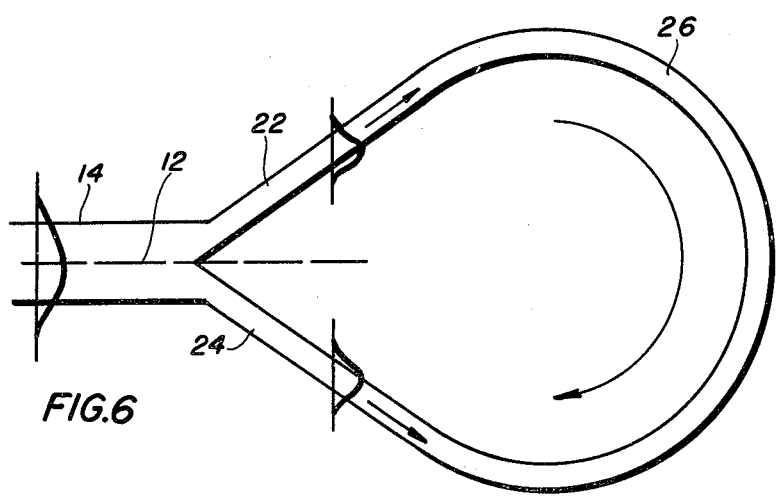
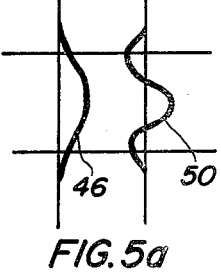

FIBER OPTIC ROTATION-SENSING GYROSCOPE WITH (3×2) COUPLER

BACKGROUND OF THE INVENTION

The present invention relates generally to Sagnac ring gyroscopes and more particularly to a Sagnac ring gyroscope with an optical coupler suitable for fabrication by integrated optics techniques.

The Sagnac ring interferometer, which employs a long single-mode fiber-optic loop, has shown promise as a passive gyroscope for navigational purposes. The properties of Sagnac fiber-optic gyroscopes are described in an article by Rashleigh and Burns entitled "Dual-Input Fiber-Optic Gyroscope", Optics Letters, Vol. 5, No. 11, p. 482, Nov. 1980. Typical Sagnac fiber-optic gyroscopes include means for introducing light beams into both ends of a fiber-optic loop and means for measuring the relative phase shift of the light beams exiting the fiber-optic loop in order to determine the rate of rotation in the plane of the fiber-optic loop. An optical coupler is utilized to introduce an incoming light beam into the interferometer, to split the incoming light beam into the counter-propagating beams in the fiber-optic loop and to cause interference between the light beams exiting the fiber-optic loop.

A typical gyroscope operates at maximum sensitivity, or quadrature, for small rates of rotation when the output beams of the optical coupler of the gyroscope have equal intensity at zero rotation rate. Prior art couplers having two input waveguides and two output waveguides, (2×2), do not operate at quadrature unless a non-reciprocal $\pi/2$ phase shift is induced into the optical path of the counter-propagating light beams. The means needed to induce the phase non-reciprocal $\pi/2$ phase shift increase the complexity and susceptiblity to noise of prior art gyroscopes using (2×2) couplers.

A (3×3) coupler as disclosed, for example, in U.S. patent application No. 320,999 by Sheem operates at quadrature for small rates of rotation but the increased separation of the optical paths providing interference between the light beams exiting the fiber-optic loop decreases the coupling between the beams, requires a longer coupling length and lowers sensitivity. Attempts to arrange the optical paths in non-planar configurations to increase coupling destroys the symmetry required for integrated optics fabrication.

OBJECTS OF THE INVENTION

Accordingly, one object of the present invention is to provide a novel Sagnac ring gyroscope which operates at maximum sensitivity for small rates of rotation.

A further objects of the invention is to provide a compact gyroscope coupler which can be precisely fabricated by integrated optical techniques for use in a Sagnac ring gyroscope.

SUMMARY OF THE INVENTION

The above and other objects are realized in the present invention by providing a Sagnac gyroscope having an optical coupler with three input waveguides, wherein a middle input waveguide is disposed between two outer input waveguides, and with two output waveguides forming branching ends of a central coupling waveguide structure. The waveguides are disposed in a common plane about an axis of symmetry in the common plane. The middle input waveguide is adapted to transmit a light beam into the coupler, the output waveguides are optically coupled to the ends of a fiber-optic loop. The intensities of the light beams exiting the coupler via the outer input waveguides are measured and compared to determine the rate of rotation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a schematic diagram of a Sagnac gyroscope interferometer with a branching waveguide coupler optically coupled to a fiber-optic loop.

FIG. 2 is a schematic diagram of a single-mode dielectric waveguide wherein the curve depicts the variation of the transverse component of the electric field of the first guided wave as a function of x.

FIG. 3 is a schematic diagram of a two-mode dielectric waveguide with two modes propagating therein.

FIG. 4 is a schematic diagram of three-mode dielectric waveguide with three modes propagating therein.

FIG. 5 is a schematic diagram illustrating the excitement of the first mode of the central waveguide by an input laser beam.

FIG. 5a is a schematic diagram depicting the excitement of the first and third modes in the section of the optical coupler where the central waveguide branches into the input waveguides.

FIG. 6 is a schematic diagram depicting the splitting of the input beam into two components which a transmitted through the fiber-optic loop in opposite directions.

DESCRIPTION OF THE PREFERRED EMBODIMENT

Figures 7, 8:
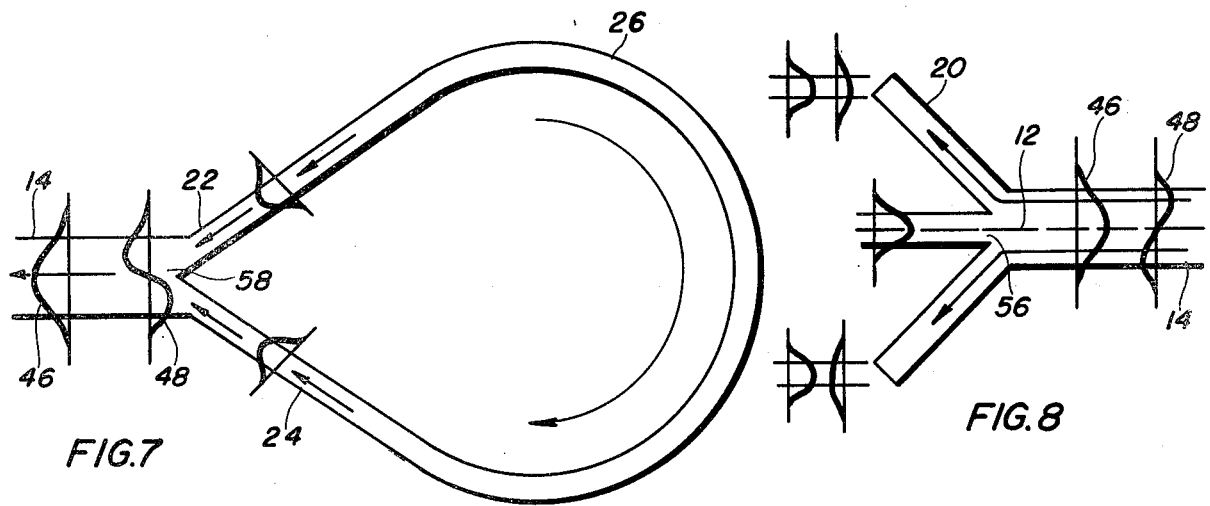
FIG. 7 is a schematic diagram depicting the excitation of modes in the central waveguide by the output beams of the fiber-optic loop.
FIG. 8 is a schematic drawing depicting the distribution of the output beam among the input waveguides.

Referring now to the drawings wherein like reference characters designate like or corresponding parts throughout the views, FIG. 1 illustrates the Sagnac interferometer utilized in one embodiment of the present invention. The interferometer comprises a (3×2) channel waveguide coupler 10 with a fiber-optic loop 26 coupled thereto. The optical coupler 10 comprises a central waveguide 14 branching into three input waveguides 16, 18, 20 and two output waveguides 22, 24 wherein the optical coupler 10 is disposed in a plane about an axis of symmetry 12. The ends 28, 30 of the fiber-optic loop 26 are optically coupled to the output waveguides 22, 24. The coupler may be fabricated on a planar, dielectric surface by methods well known in the art and hence is ideally suited for fabrication by integrated optical techniques.

A general description of the operation of a Sagnac fiber-optics gyroscope and a detailed description of the functioning of the present invention follows.

In a typical application the assembly of FIG. 1 is disposed upon a rotating platform and the plane of the fiber-optic loop is perpendicular to the axis of rotation of the platform so that rotation rate of the platform is sensed. The middle input waveguide 18 is adapted to transmit a light beam into the coupler 10. The light beam is split into two equal components at the output waveguides, 22, 24; a first component propagating through the fiber-optic loop 26 in a clockwise direction and a second component propagating in a counter-clockwise direction. When these two counter-propagating light beams have traversed the fiber-optic loop 26 they will reenter the coupler 10 through the output waveguides 22, 24 and interfere with each other in the central waveguide 14. This light interference will cause the intensities of the output light beam components to be dependent on the relative phase of the output light beam components from the fiber-optic loop 26. As the platform is rotated there is a measurable difference between the intensities of the output light beams in the outer (upper 20 and lower 16) input waveguides. This measurable change in intensity is due to the relative phase shift between the light propagating in the clockwise direction and the counter-clockwise direction in the fiber-optic loop 26 and is a function of the phase shift between the two counter-propagating optical beams which, in turn, is proportional to the rotation rate in the plane of the fiber-optic loop 26. Thus, the rotation rate is determined by measuring and comparing the intensities of the light beams leaving the coupler 10 via the outer (upper 20 and lower 16) input waveguides. To this end, the outer (upper 20 and lower 16) input waveguides are adapted so that the intensities of the light beam components propagating therein may be measured by photodetector means.

The manner in which the coupler 14 illustrated in FIG. 1 function is described more fully below. The input waveguides 16, 18, 20 and output waveguides 22, 24 are one-mode dielectric channel waveguide while the central waveguide 14 is a two-mode dielectric channel waveguide.

FIGS. 2, 3, and 4 illustrate the possible guided modes of radiation in a one, two and three mode waveguide respectively. A rectangular dielectric channel 42 is formed in a substrate 44 having an index of refraction less than that of the channel 42. Only certain discrete modes of radiation may propagate in the waveguide. The magnitude of the transverse electric field for a wave propagating in the x direction is shown by the curve 46 in FIG. 1 for a single mode waveguide. FIGS. 3 and 4 illustrate waveguides capable of transmitting second and third modes 48 and 50. Note that the first mode 46 is present in each waveguide. Higher modes will be cut off as the width of the channel 42 is decreased. A complete explanation of the propagation of light in waveguides is found in the book by Yariv entitled Introduction to Optical Electronics, 2nd Edition, Holt, Rinehart and Winston (1976).

FIGS. 5, 6, 7 and 8 illustrate the manner in which the coupler 10 distributes the incoming light beam between the ends 28, 30 of the fiber-optic loop 26 and provides for interference between the output beams of the fiber-optic loop 26.

In FIG. 5 the manner in which a light beam enters the coupler 10 is illustrated. The middle input waveguide 18 is adapted to receive a light beam from an external source such as a laser. Light is guided in the middle input waveguide 18 in the first mode 46. The branching region is capable of supporting three guided modes, but since the distribution of the input mode 46 is symmetric about the axis, only the symmetric first 46 and third 50 modes are excited. As the radiation enters the central waveguide 14 the third mode 50 cuts off since the two-mode central waveguide 14 can only transmit the first 46 and second 48 modes of radiation. Thus, part of input light beam is lost as the third mode 50 cuts off and radiates into the substrate. The amount of input radiation lost depends on the design of the branches, but is one-third of the input intensity for optimum design parameters.

FIG. 6 illustrates the splitting of the input beam into equal components which propagate in opposite directions through the fiber-optic loop 26. The intensities of the split beams are equal because of symmetry, therefore the coupler functions as a 3 dB beamsplitter.

Turning now to FIG. 7, the manner in which interference is provided between the output beams of the fiber-loop 26 is illustrated. If the Sagnac gyroscope is rotating the counter-propagating beams in the fiber-optic loop 26 will experience a relative Sagnac phase shift of $2\phi$. Thus, the complex amplitudes of the output beams have phases of $Ae^{i\phi}$ and $Ae^{-i\phi}$, where A is a normalization factor. The output beams re-enter the central waveguide 14 and propagate as a linear combination of the first and second guided modes. In order to determine the amplitudes of the first and second modes, the relationship:

$$Ae^{i\phi} = A\cos\phi + Ai\sin\phi \tag{1}$$

and $$Ae^{-i\phi} = A\cos\phi - Ai\sin\phi \tag{2}$$

are utilized. Note that as the output beams re-enter the central waveguide 14 via the output waveguides 22, 24 the amplitude of the real component of each output beam is equal to $A\cos\phi$. Thus the amplitude of the real component of the field has the same sign above and below the axis of symmetry. Therefore the real components of the output beams excite only the symmetric first mode 46 of the central waveguide 14 where the amplitude co-efficient for the first mode 46 is $A\cos\phi$.

However, the amplitudes of the imaginary component of the output beams $A\sin\phi$ and $-A\sin\phi$, have different signs. Thus the amplitude of the imaginary component of the field has a different sign above and below the axis of symmetry. Therefore, the imaginary components of the output beam excite only the antisymmetric second mode 48 of the central waveguide 14 where the amplitude co-efficient of the second mode 48 is $iA\sin\phi$.

The distribution of the output radiation among the three input wave guides 16, 18, 20 is depicted in FIG. 8. Each input waveguide 16, 18, 20 transmits light in only one mode. The amplitude of the modes in the input waveguides 16, 18, 20 will depend on the intensity of the field in the central waveguide 14 at the point 56 where the central waveguide 14 branches into the input waveguides 16, 18, 20.

The output field in the central waveguide 14 is the sum of the field of first mode 46, $E_1(\phi,z,x)$, and the field of the second mode 48, $E_2(\phi,z,x)$. The fields are given by:

$$E_1(\phi,z,x) = \sqrt{2}\, A f_1(x)\cos\phi\, e^{-i\beta_1 z} = E_1(\phi,x)e^{-i\beta_1 z} \quad (3)$$

$$E_2(\phi,z,x) = \sqrt{2}\, i A f_2(x)\sin\phi\, e^{-i\beta_2 z} = \quad (4)$$

$$\sqrt{2}\, A\sin\phi f_2(x)e^{-i\beta_2 z + \pi/2} = E_2(\phi,x)e^{-i\beta_2 z + \pi/2}$$

since $i = e^{i\pi/2}$, where z is zero at the point 58 where the central waveguide 14 branches into the output waveguides 22, 24 $\beta_1$ and $\beta_2$ are the propagation constants for the first and second modes which are calculated from formulae well-known in the art, $f_1(x)$ is a normalized function representing the x dependence of the transverse field of the first mode 46 and $f_2(x)$ is a normalized function representing the x dependence of the transverse field of the second mode 48.

The intensity of the field in the central waveguide 14 is:

$$I = |E_1(\phi,z,x) + E_2(\phi,z,x)|^2 = E_1^2(\phi,x) + E_2^2(\phi,x) + \Delta(\phi,x) + \Delta(\phi; x) \quad (5)$$

where $$\Delta(\phi,x) = 2E_1(\phi,x)E_2(\phi,x)\cos[(\beta_1-\beta_2)z - \pi/2] \quad (6)$$

At $z = L$, the point 56 where the central waveguide 14 branches into the input waveguides 16, 18, 20

$$\Delta(\phi,x) = 2E_1(\phi,x)E_2(\phi,x)\cos[(\beta_1-\beta_2)L - \pi/2] \quad (7)$$

For the phase relationships between the first 46 and second modes 48 depicted by the curves in FIG. 8, $E_1(\phi,x)E_2(\phi,x)$ is positive above the axis of symmetry 12 since $E_1(\phi,x)$ and $E_2(\phi,x)$ have the same sign. However, $E_1(\phi,x)E_2(\phi,x)$ is negative below the axis 12 since $E_1(\phi,x)$ and $E_2(\phi,x)$ have different signs. Thus the sign of $\Delta(\phi,x)$ will differ above and below the axis of symmetry 12 and the difference between the intensities of the output beams in the upper input waveguide 18 and lower input waveguide 16, which determines the sensitivity of the interferometer, is proportional to $2\Delta(\phi,x)$. The sensitivity is a maximum when $\Delta(\phi,x)$ is a maximum or when $\cos[(\beta_1-\beta_2)L - \pi/2] = 1$ which requires that $$(\beta_1-\beta_2)L = \pi/2 \quad (8)$$

The above discussion illustrates the physical principles underlying the operation of the interferometer. For the symmetric coupler illustrated in FIG. 1 the exact expressions for the normalized intensities of the output beams in the input waveguides are:

$$I_{upper} = \frac{1}{9}(2 - \cos 2\phi + \sqrt{3}\sin 2\phi) \quad (9)$$

$$I_{middle} = \frac{2}{9}(1 + \cos 2\phi) \text{ and} \quad (10)$$

$$I_{lower} = \frac{1}{9}(2 - \cos 2\phi - \sqrt{3}\sin 2\phi). \quad (11)$$

Note that $I_{upper} = I_{lower}$ for $2\phi = 0$ so that the present Sagnac gyroscope operates at quadrature and thus at maximum sensitivity for small phase shifts.

Photodetectors are employed to create output signals having amplitudes proportional to $I_{upper}$ and $I_{lower}$. The rotation $-$rate$(\Omega)$ may be determined by first plotting the function:

$$S = I_{upper} - I_{lower} = \frac{2\sqrt{3}}{9}\sin 2\phi. \quad (12)$$

Next, the output signals of the photodetectors are electronically processed to produce a signal corresponding to $I_{upper} - I_{lower} = S$. Finally, the value of the signal, S, is located on the plot to determine $\sin 2\phi$ and the rate of rotation $\Omega$ is determined from the relationship:

$$2\phi = \frac{8\pi NA\Omega}{\lambda c} \quad (13)$$

where NA is the total area enclosed by the fiber-optic loop; $\lambda$ and c are the free-space wavelength and the light velocity, respectively, of the input beam.

It is understood by persons of ordinary skill in the art that the output of a physical embodiment of the present invention will not correspond exactly to values predicted by eqs. (9), (10) and (11). A correction factor to eqs. (9), (10) and (11) will be necessary to account for imperfections inherent in any physical structure. The correction factor will be readily attainable by calibration techniques well-known in the art.

Figure 9:
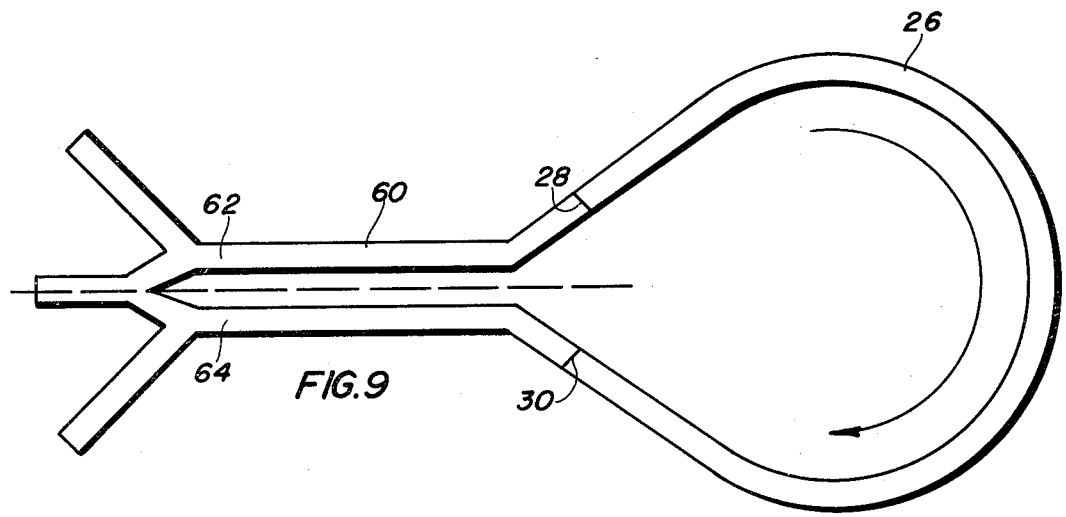
FIG. 9 is a schematic diagram depicting a first alternative embodiment of the coupler utilized in the present invention wherein the central waveguide is replaced by a two channel directional coupler.

FIG. 9 depicts a first alternative embodiment of the present invention wherein the two-mode central 14 waveguide is replaced by a two-channel directional coupler 60. The directional coupler 60 comprises two one-mode channel waveguides 62, 64, disposed so that the guided modes propagating in the waveguides are coupled by their evanescent field. The directional coupler 60 may propagate radiation in two modes. In the symmetric first mode the signs of the fields in both channels are equal while in the anti-symmetric second modes the fields are of opposite sign. The modes have propagation constants $K_1$ and $K_2$ respectively and the physical principles underlying the operation of the interferometer are analogous to the embodiment utilizing the two-mode central waveguide 14. A full explanation of the operation of a directional coupler 60 and formulae for calculating $k_1$ and $K_2$ are disclosed in the article by E. A. J. Marcatali entitled "Dielectric Rectangular Waveguides and Directional Coupler for Integrated Optics"., Bell Syst. Tech. J., vol. 48, pp. 2071–2102, September 1967 which is hereby incorporated by reference.

The theoretical intensities of output beams propagating in the input waveguides are given by equations (9), (10) and (11). For maximum sensitivity $$(K_1 - K_2)L = \pi/2 \quad (14)$$

where L is the length of the directional coupler 60.

Figure 10:
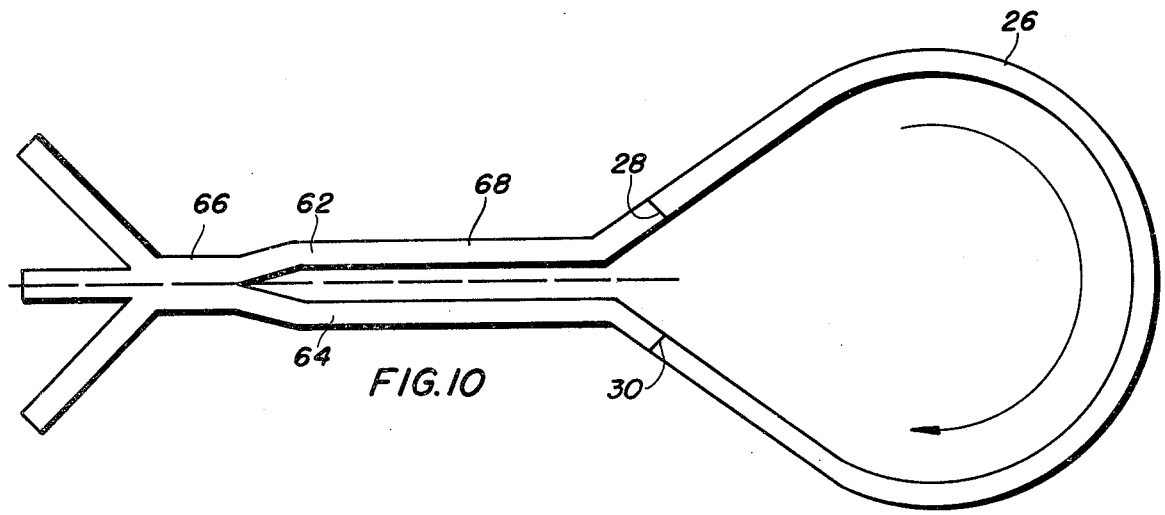
FIG. 10 is a schematic diagram depicting a second alternative embodiment of the coupler utilized in the present invention wherein the central waveguide is replaced by a combination of a central waveguide and a two-channel directional coupler.

FIG. 10 depicts a second alternative embodiment wherein the two-mode central waveguide 14 is replaced by a combination of a two-mode waveguide 66 and a two-channel directional 65 coupler. The theoretical intensities of the output beams propagating in the input waveguides are given by equations (9), (10) and (11).

The utility of (3×2) optical coupler disclosed herein is not limited to Sagnac fiber-optic gyroscopes. Those skilled in the art will recognize many applications for the optical coupler disclosed and claimed herein.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed and desired to be secured by letters patent of the united states is:

1. A Sagnac rotation-sensing apparatus comprising:
   an interferometer including an optical coupler with three input waveguides and two output waveguides wherein said input waveguides are disposed so that two outer input waveguides are positioned about a middle input waveguide, said interferometer also including a fiber-optic loop with the ends of said fiber-optic loop optically coupled between said output waveguides of said optical coupler;
   means for introducing a light beam, into said middle input waveguide, to propagate toward the ends of said fiber-optic loop; and
   means for measuring the intensity of light beams, propagating away from the ends of said fiber-optic loop, in said outer input waveguides.

2. The Sagnac rotation-sensing apparatus recited in claim 1 wherein said optical coupler further includes:
   a central waveguide with an input end branching into said three input waveguides and with an output end branching into said two output waveguides.

3. The Sagnac rotation-sensing apparatus recited in claim 2 wherein:
   said central waveguide is a two-mode dielectric channel waveguide; and
   said three input waveguide and said two output waveguides are one-mode dielectric channel waveguides.

4. The Sagnac rotation-sensing apparatus recited in claim 3 wherein:
   said central waveguide, said input waveguides, and said output waveguides are disposed in a common plane; and
   said coupler has an axis of symmetry in said common plane passing through the center of said central and said middle input waveguides.

5. The Sagnac rotation-sensing apparatus recited in claim 4 wherein:
   the propagation constants of the two modes of said central waveguide are $\beta_1$ and $\beta_2$; and
   wherein the length, L, of said central waveguide is determined by the relationship $$(\beta_1 - \beta_2)L = \pi/2.$$

6. A Sagnac rotation-sensing apparatus comprising:
   an interferometer including an optical element with an input end branching into three input waveguides, wherein said input waveguides are disposed so that two outer input waveguides are positioned about a middle input waveguide, said optical element also having an output end branching into two channels of a directional coupler, said interferometer also including a fiber-optic loop with ends optically coupled between said channels of said directional coupler;
   means for introducing a light beam, into said middle input waveguide, to propagate toward the end of said fiber-optic loop; and
   means for measuring the intensity of light beams, propagating away from the ends of said fiber-optic loop in said outer input waveguides.

7. The Sagnac rotation-sensing apparatus recited in claim 6 wherein:
   said channels of said directional coupler and said input waveguides are one-mode channel waveguides.

8. The Sagnac rotation-sensing apparatus recited in claim 7 wherein:
   said input waveguides and said channels of said directional coupler are disposed in a common plane; and
   said input waveguides and said channels are symmetrically disposed about an axis in said common plane positioned in the center of said middle input waveguide and between said channels.

9. The Sagnac rotation-sensing apparatus recited in claim 8 wherein:
   the propagation constants of said directional coupler are $K_1$ and $K_2$; and
   wherein the length, L, of said directional coupler is determined by the relationship $$(K_1 - K_2)L = \pi/2$$

10. A Sagnac rotation-sensing apparatus comprising:
    an interferometer including a central waveguide with an input end branching into three input waveguides wherein said input waveguides are disposed so that two outer input waveguides are positioned about a middle input waveguide, said central waveguide also with an output end branching into two channels of a directional coupler, said interferometer also including a fiber-optic loop with the ends of the fiber-optic loop optically coupled between said channels of said directional coupler;
    means for introducing a light beam, into said middle input waveguide to propagate toward the ends of said fiber-optic loop; and
    means for measuring the intensity of light beams, propagating away from the ends of said fiber-optic loop in said outer input waveguides.

11. The Sagnac rotation-sensing apparatus recited in claim 10 wherein:
    said central waveguide is a two-mode dielectric channel waveguide; and
    said three input waveguides and said channels of said directional coupler are one-mode dielectric waveguides.

12. The Sagnac rotation-sensing apparatus recited in claim 11 wherein:
    said central waveguide, said input waveguides and said channels of said directional coupler are disposed in a common plane; and
    said central and input waveguides and said channels are symmetrically disposed about and axis in said common plane positioned in the center of said middle input waveguide and said central waveguide and positioned between said channels.

13. An improved optical coupler for a fiber-optic interferometer, wherein the improved optical coupler comprises:
    a central waveguide with an input end branching into three input waveguides and with an output end branching into two output waveguides.

14. The optical coupler recited in claim 13 wherein:
said central waveguide is a two-mode dielectric channel waveguide; and
said three input and said two output waveguides are one-mode dielectric channel waveguides.

15. The optical coupler recited in claim 14 wherein:
said central waveguide, said input waveguide and said output waveguides are disposed in a common plane; and
said coupler has an axis of symmetry in said common plane passing through the center of said central waveguide.

16. The optical coupler recited in claim 15 wherein:
the propagation constants of the two modes of said central waveguide are $\beta_1$ and $\beta_2$; and
wherein the length, L, of said central waveguide is determined by the relationship $$(\beta_1-\beta_2)L=\pi/2$$

17. An improved optical coupler for a fiber-optic interferometer, wherein said improved optical coupler comprises:
an optical element with an input end branching into three input waveguides, wherein said input waveguides are disposed so that two outer input waveguides are positioned about a middle input waveguide, said optical element also having an output end branching into two channels of a directional coupler.

18. The optical coupler recited in claim 17 wherein:
said channels of said directional coupler and said input waveguides are one-mode channel waveguides.

19. The optical coupler recited in claim 18 wherein:
said input waveguides and said channels of said directional coupler are disposed in a common plane; and
said input waveguides and said channels are symmetrically disposed about an axis in said common plane positioned in the center of said middle input waveguide and between said channels.

20. The optical coupler recited in claim 19 wherein:
the propagation constants of the two modes of said directional coupler are $K_1$ and $K_2$; and
wherein the length, L, of the directional coupler is determined by the relationship $$(K_1-K_2)L=\pi/2$$

21. An improved optical coupler for an optical fiber interferometer, wherein said improved optical coupler comprises:
a central waveguide with an input end branching into three input waveguides wherein said input waveguides are disposed so that two outer input waveguides are positioned about a middle input waveguides, said central waveguide also with an output end branching into two channels of a directional coupler.

22. The optical coupler recited in claim 21 wherein:
said central waveguide is two-mode dielectric channel waveguide; and
said three input waveguides and said channels of said directional coupler are one-mode dielectric channel waveguides.

23. The optical coupler recited in claim 22 wherein:
said central waveguide, said input waveguides and said channels of said directional coupler are disposed in a common plane; and
said central and input waveguides and said channels are symmetrically disposed about an axis in said common plane positioned in the center of said middle input waveguide and said central waveguide and positioned between said channels.

* * * * *